(12) United States Patent
Sanghvi

(10) Patent No.: US 12,120,104 B2
(45) Date of Patent: Oct. 15, 2024

(54) DECENTRALIZED EDGE NODE AUTHENTICATION

(71) Applicant: Bank of America Corporation, Charlotte, NC (US)

(72) Inventor: Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 326 days.

(21) Appl. No.: 17/891,179

(22) Filed: Aug. 19, 2022

(65) Prior Publication Data

US 2024/0064137 A1 Feb. 22, 2024

(51) Int. Cl.
*H04L 9/40* (2022.01)

(52) U.S. Cl.
CPC ........ *H04L 63/0823* (2013.01); *H04L 63/083* (2013.01)

(58) Field of Classification Search
CPC .......................... H04L 63/0823; H04L 63/083
USPC ............................................................. 726/5
See application file for complete search history.

(56) References Cited

U.S. PATENT DOCUMENTS

| 9,912,486 | B1* | 3/2018 | Sharifi Mehr | ........ H04L 9/3265 |
| 11,552,803 | B1* | 1/2023 | Simkhada | ............... G06F 21/73 |
| 2006/0095923 | A1* | 5/2006 | Novack | ............... G06Q 20/0855 |
| | | | | 719/318 |
| 2013/0238895 | A1* | 9/2013 | Dixon | .................. H04L 63/0823 |
| | | | | 713/156 |
| 2016/0269440 | A1* | 9/2016 | Hartman | .................. H04L 51/42 |
| 2017/0155626 | A1* | 6/2017 | Li | ............................ H04L 9/321 |
| 2018/0288031 | A1* | 10/2018 | Kumar | ................ H04L 63/0807 |
| 2019/0044950 | A1* | 2/2019 | Chen | ........................ H04L 67/02 |

OTHER PUBLICATIONS

Da Wang et al., "Robust Network Coding in the Presence of Untrusted Nodes," https://arxiv.org/pdf/0811.3475.pdf, Nov. 21, 2008.
Reddy et al., "Assessing Node Trustworthiness Through Adaptive Trust Threshold for Secure Routing in Mobile Ad Hoc Networks," https://thesai.org/Downloads/Volume13No4/Paper_26-Assessing_Node_Trustworthiness_through_Adaptive_Trust.pdf, International Journal of Advanced Computer Science and Applications, Nov. 4, 2022.
"Public-Key Cryptography," https://en.wikipedia.org/wiki/Public-key_cryptography, Wikimedia Foundation, Inc., Jul. 19, 2022.

* cited by examiner

*Primary Examiner* — Teshome Hailu
(74) *Attorney, Agent, or Firm* — Weiss & Arons LLP

(57) ABSTRACT

This application describes a security framework that allows a data payload transmitted on a network to be validated locally by any node on the network. A node that first receives the data payload may validate the information included in the data payload and generate a digital certificate based on the information. Each node that receives the data payload from the originating node may validate the digital signature using a locally accessible cryptographic key. The framework may support multiple security tiers by configuring nodes to mask information included in a data payload before transmitting the requested data payload to another node.

15 Claims, 6 Drawing Sheets

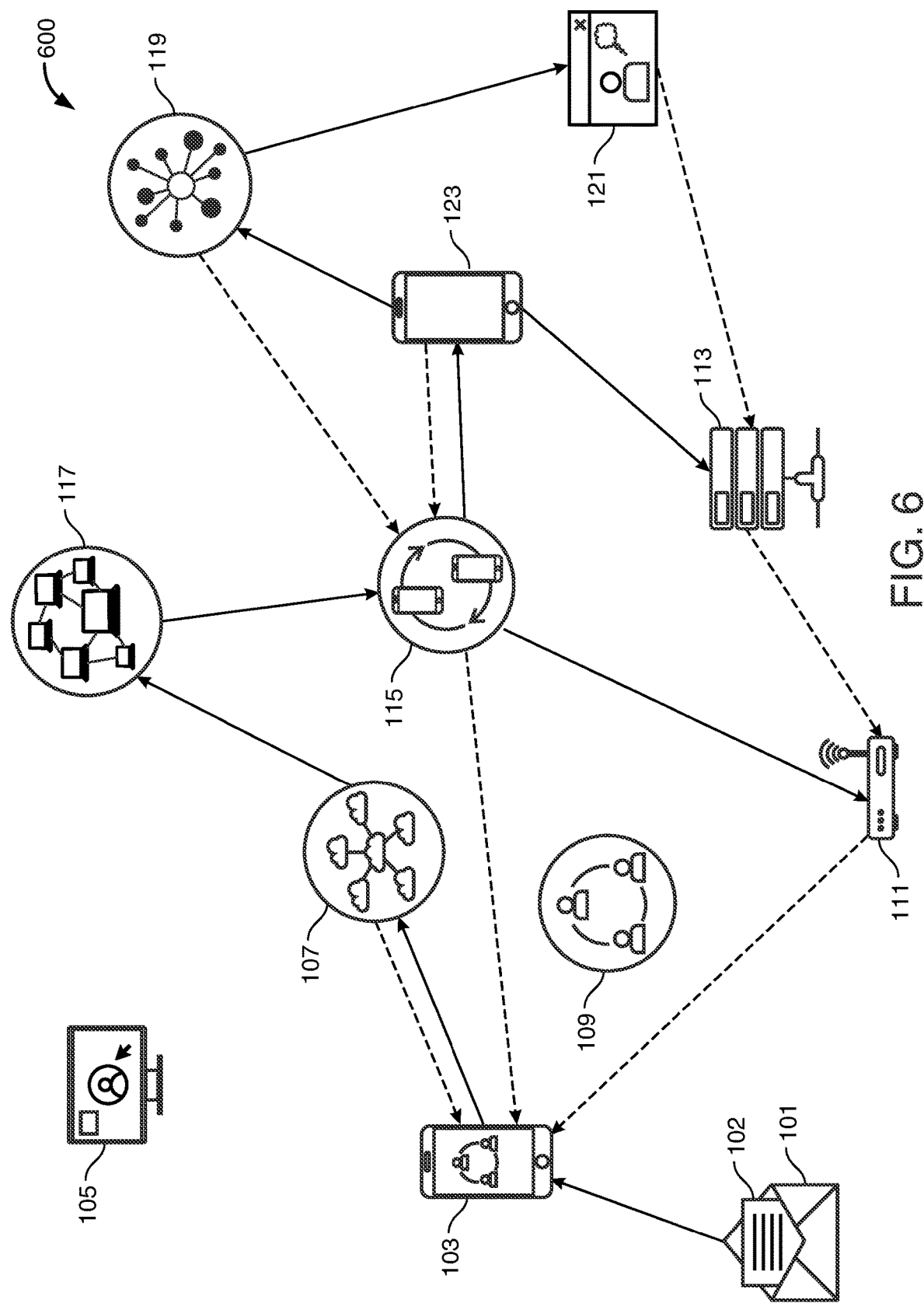

DECENTRALIZED EDGE NODE AUTHENTICATION

FIELD OF TECHNOLOGY

This application describes a security framework that provides improved security for data transmitted on a computer network and minimizes bandwidth overhead needed to implement the improved security.

BACKGROUND

In conventional data networks, an edge node may authenticate data and then transmit the authenticated data to other nodes on the network. However, the other nodes on the network may not authenticate the received data or may require communication with the edge node to authenticate the data. Both these options have consequences that are detrimental to performance of the network. If a receiving node does not authenticate the data, there is a risk that an untrusted node has changed the data before it is received. The change to the data may be inadvertent or may be malicious.

On the other hand, authenticating the received data conventionally requires communication with the edge node or other nodes. Communication with another node will consume bandwidth on the network that could have otherwise been utilized for transmission of other data. Additionally, the authentication request from a receiving node must be processed by the other node. Processing the authentication request requires computer power and energy. Using processing power of the other node to re-authenticate the data increases energy consumption of the network and reduces processing efficiency of the edge node.

Accordingly, it would be desirable to provide apparatus and methods that allow nodes on a network to locally authenticate received data without increasing network bandwidth overhead. Furthermore, it would be desirable to provide a framework that supports multiple security tiers and masks information included in a data payload before transmitting the requested data payload to another node. Therefore, it is desirable to provide apparatus and methods for DECENTRALIZED EDGE NODE AUTHENTICATION.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 shows illustrative paths for routing data in accordance with principles of the disclosure relative to paths for routing data in accordance with prior art systems.

DETAILED DESCRIPTION

Figure 1:
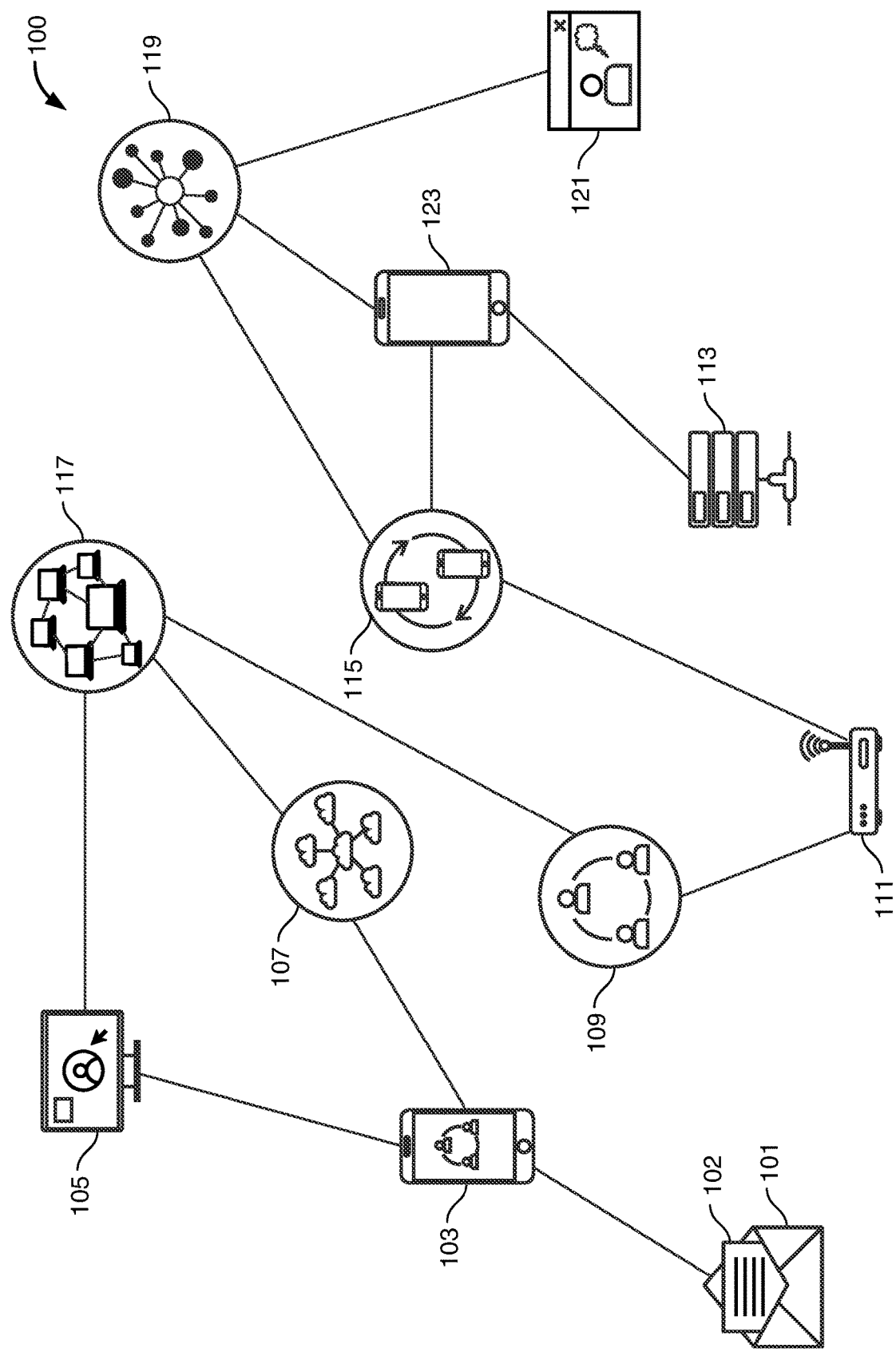
FIG. 1 shows an illustrative network and associated nodes in accordance with principles of the disclosure.

Apparatus and methods for a network security framework are provided. The security framework may allow a data payload to be authenticated locally by any nodes on the network. An illustrative data payload may include authentication credentials needed to authorize a secure transaction. The network security framework may allow any node on the network to authenticate a data payload. The node may tokenize the authentication. The tokenized authentication may be verified and accepted by other nodes on the network. After a node verifies an authentication associated with a data payload, the node may process a requested transaction. An illustrative transaction may include financial transactions conducted at an automated teller machine.

The network security framework may allow nodes to assign different security tiers to data payloads. The security tiers may be assigned based on the type of transaction involved or information included in a data payload. The security tier may indicate that specific information included in a data payload must be masked or removed from the data payload before the data payload is shared with other nodes. For example, an end node that is transiently connected to two or more networks may not receive access to confidential information.

Generally, a network may include multiple nodes. A node may be a computer system. Each node on the network may include a processor circuit. The processor circuit may control overall operation of the node and its associated components. A processor circuit may include hardware, such as one or more integrated circuits that form a chipset. The hardware may include digital or analog logic circuitry configured to perform any suitable (e.g., logical) computing operation.

A node may include one or more of the following components: I/O circuitry, which may include a transmitter device and a receiver device and may interface with fiber optic cable, coaxial cable, telephone lines, wireless devices, physical layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Components of a node may be present on one or more circuit boards. In some embodiments, the components may be integrated into a single chip, such as a system-on-a-chip. The chip may be silicon-based.

A node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage media. Software applications may provide instructions to the processor that enable a node to perform various functions. For example, the non-transitory memory may store software applications used by a node, such as an operating system, application programs, and an associated database. Alternatively, some or all of computer executable instructions of a node may be embodied in hardware or firmware components of the node. Software application programs, which may be used by a node, may include computer executable instructions for invoking user functionality related to communication, such as email, short message service ("SMS"), and voice input and speech recognition applications.

A node may support establishing network connections to one or more other nodes on the network. Such remote nodes may be edge-nodes, sensors, actuators or other computing devices. A node may be a personal computer or computer server. A node may include a modem, antenna, a network interface or adapter or other communication circuitry for establishing communications over a network, such as the Internet.

Via the communication circuitry, a node may access network connections and communication pathways external to the node. Illustrative network connections may include a local area network ("LAN") and a wide area network ("WAN") and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

A node may include various other components, such as a display, battery, speaker, and antennas. A node may be a portable device such as a laptop, tablet, smartphone, other "smart" devices (e.g., watches, eyeglasses, clothing having embedded electronic circuitry) or any other suitable device for receiving, storing, transmitting and/or displaying electronic information.

A node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

A node may utilize computer-executable instructions, such as program modules, executed by a processor. Software applications may include multiple program modules. Generally, program modules include routines, programs, objects, components, data structures, etc. that perform particular tasks or implement particular abstract data types. A node may be operational within a distributed computing environment where tasks are performed by remote processing devices that are linked through a communications network. In a distributed computing environment, program modules may be located in both local and remote computer storage media including memory storage devices. A node may interact with a network of remote servers hosted on the Internet to store, manage, and process data (e.g., a cloud computing environment).

A node may include a battery. The battery may be a power source for electronic components of the node. For example, the battery may supply power to the display, the communication circuit and the processor circuit. In some embodiments, a node may include a plurality of batteries. A node may include solar panels that convert solar energy into electricity that power one or more components of the node.

A node may receive data in real-time or at pre-defined intervals, such as once a day. A node may filter data received from one or more other nodes. A node may repackage or reformat received data. Data conversion may include transformation of low-level raw data (possibly from multiple sensors or groups of sensors) into meaningful information for a specific audience or for a specific analysis. Data conversion may include filtering or masking data before forwarding data to another node.

A node may perform pattern recognition to identify correlations and trends in captured data. The correlations and trends may indicate expected or current resource consumption. A node may redistribute resources based on expected or current resource usage. A node may route consumers to a location that has available resources to service the consumption.

A node may evaluate a cost of resource consumption or costs of redistributing resources and/or consumers. "Costs" may be monetary (e.g., labor costs or infrastructure costs), time-related or related to a level of intrusion needed to obtain desired data. "Costs" may be bandwidth related. For example, a communication pathway may be associated with a fixed bandwidth. A communication pathway may include nodes and network connectivity linking those nodes. The bandwidth may limit an amount of information or a rate of transmission over the communication pathway.

As further example, a node may respond slowly to a request from another node if there is a large amount of data traffic traveling on a communication pathway shared with other nodes. The large amount of data traffic may not leave sufficient bandwidth for the transmitting node to timely communicate with the requesting node.

As a further example, a node may respond slowly if the node transmits a large amount of data. If transmitted all at once, the large amount of data transmitted by the node, together with other data traffic traveling on a shared communication pathway, may be close to, or exceed bandwidth resources of the communication pathway. As a result, the network may become congested and other nodes on the network may be unable to transmit time-sensitive data in a timely manner.

Data travelling within a network to/from nodes may be routed along multiple communication pathways until the transmitted information reaches a desired destination node (e.g., a cloud computing environment). Each communication pathway may service a number of connected nodes and a respective volume of informational traffic.

It may be difficult to ascertain available bandwidth resources on a particular communication pathway. It may be difficult to ascertain which communication pathways are being utilized to transmit information between nodes. Nodes attempting to transmit information over a communication pathway may not be aware of a number of interconnected nodes, a volume of traffic on a particular communication pathway or a bandwidth capacity of a communication pathway.

Furthermore, a communication pathway may be controlled by a different entity from an entity responsible for operation of a particular node. The entity responsible for operation of the node may be unable to monitor a number of nodes that share a communication pathway, a bandwidth capacity of a communication pathway or a volume of traffic transmitted on a communication pathway. A node may be configured to manage data transmission of other nodes and associated bandwidth usage and reduce network congestion.

Methods for enhancing security of data transmitted on a network are provided. Methods may include authenticating a data payload received at a first node on the network. The data payload may include user authentication information, such as biometric data or a password. The data payload may include transaction information, such as an account transfer data or remote deposit data.

Authenticating the data payload may include submitting the data payload to a remote server such as a cloud computing environment. The remote server may determine whether the data payload corresponds to data records on file with remote server. In response to successfully authenticating the data payload, methods may include generating a digital certificate. The digital certificate may be signed by the first node. The digital certificate may be signed by the remote server.

The digital signature may be generated by a mathematical algorithm that validates the authenticity and integrity of the data payload (e.g., an email, a credit card transaction, or a digital document). The digital signature may be unique to a system or entity usable to protect integrity of the data payload. For example, if the data payload includes an email message, the content of the email may be part of the digital signature.

The digital signature may provide authentication that the data payload was not modified—intentionally or unintentionally—from the time it was digitally signed. The process for generating a digital signature may include generating a unique hash of the data payload and encrypting the hash value using a cryptographic key. The encrypted hash value may be the digital certificate associated with a data payload.

A hash function is a fixed-length string of numbers and letters ("hash value") generated from a mathematical algorithm, a node's (private or public) cryptographic key and the data payload itself. The generated hash value is unique to the data payload. Changing any part of the data payload will completely change the generated hash value. The hash function is a "one-way function." A computed hash value cannot be reversed to find other data payloads that may generate the same hash value. Illustrative hash functions in use today are Secure Hash Algorithm-1 (SHA-1), the Secure Hashing Algorithm-2 family (SHA-2 and SHA-256), and Message Digest 5 (MD5).

The cryptographic key may be a private key that is only accessible to the node generating the digital certificate. Any other node can verify authenticity of the digital certificate using the sending node's corresponding public cryptographic key. Alternatively, a sending node can encrypt a hash value using the public cryptographic key of a target receiving node. The encrypted data payload can only be decrypted using the private cryptographic key of the target receiving node.

The aforementioned authentication methods do not require communication with the first node. The second node may already be in possession of the cryptographic key needed to authenticate the digital certificate. Thus, the described authentication methods may not consume network bandwidth to communicate with the first node. Even if the second node does not have access to the corresponding cryptographic key needed to authenticate a digital certificate, obtaining the needed cryptographic key may only require minimal bandwidth. A typical cryptographic key may only be 1024 or 2048 bits. Requesting and obtaining the needed cryptographic key may require significantly less bandwidth than the second node submitting the data payload itself to the first node, a remote server or cloud computing environment for re-authentication.

After the digital certificate is generated for a data payload, the digital certificate is included in a transmission of the data payload sent to a receiving node. After receiving the data payload and associated digital certificate, the receiving node generates its own hash value of the data payload and decrypts the sending node's digital certificate using the sending nodes public key. The receiving node compares their own hash value to the hash value extracted by decrypting the data payload. If the two hash values match, the data payload has not been modified and the data payload is authenticated by the receiving node.

Methods may include packaging the data payload and the digital certificate into a container. Methods may include forwarding the container to a second node on the network. At the second node, methods may include confirming that the digital certificate has been signed by the first node. In response to the confirming, methods may include forwarding the data payload to a third node on the network. The second node may generate a new digital signature before forwarding the data payload to the third node. The second node may forward, to the third node, the container that include the digital certificate generated by the first node.

Methods may include determining that the digital certificate has not been generated by the first node. For example, the second node may receive a data payload that has not been authenticated by any node on the network. Alternatively, the second node may not have access to the public cryptographic key of the first node that generated the digital certificate. When the second node is unable to authenticate a received data payload, the second node itself may attempt to authenticate the data payload. In such scenarios, the second node may initiate a connection to remote server or cloud computing environment to authenticate the data payload.

After a threshold number of nodes have successfully confirmed that the digital certificate has been signed by the first node, methods may include forwarding the data payload within the network without checking that the digital certificate has been signed by the first node. The authentication of the digital certificate by the threshold number of nodes may establish a working assumption that the data payload has been duly authenticated by the first node. Avoiding any additional authentication of the digital certificate may allow nodes to avoid expending processing power that otherwise would have been needed to authenticate the digital certificate.

The process of confirming that the digital certificate has been validly signed by the first node may include a second node determining whether the digital certificate is associated with a timestamp outside target time window. For example, the first node may generate a digital certificate that includes a timestamp. The second node may only recognize the digital certificate as valid within a target time window after the timestamp included in the digital certificate. After expiration of the target time window, a second node that receives the data payload may independently authenticate the data payload. Such independent authentication may include requiring a customer to provide biometric or other credentials before the second node executes any transactions based on the data payload.

The process of confirming the digital certificate may include a second node determining whether the digital certificate has been signed by the first node within a target geographic location. The first node may embed the target geographic location within the generated digital certificate. If the second node determines that the digital certificate has been generated in a location outside the target geographic location, the second node may independently authenticate the data payload.

The method may include receiving the data payload from an untrusted node. An untrusted node may be any node on the network that may be operating weak or outdated software, weak security tools, excessive permissions, misconfigurations, questionable content, applications, and or malware. Such untrusted nodes may pose a risk to a security and integrity of data on a network. An untrusted node may operate in environments that are untrusted. For example, the untrusted node may transiently connect to one or more networks, some trustworthy and others not. Exemplary untrusted networks may include public Internet access points or other publicly accessible networks.

The untrusted nodes may transmit malware to a trusted node (e.g., cross contamination) or may allow the unauthorized release of data from within a network.

When a trusted node receives a data payload from the untrusted node, the trusted node must assess whether the data payload will infect the trusted node with malware or pose other security risk to the trusted node. Conventionally, the trusted node must reassess the authenticity of the data payload received from the untrusted node. Such a reassessment may require the trusted node to expend processing power and consume additional network bandwidth.

However, if the data payload includes a digital certificate, the trusted node may simply confirm that the digital certificate has been issued by another trusted node. If the digital certificate has been issued by another trusted node, then despite receiving the data payload from an untrusted node, the data payload may not pose a security risk. After confirming that the data payload received from the untrusted node has been issued by another trusted node, the data payload may be utilized in a trusted application. The trusted application may be a software application that is assumed to be executed with a threshold level of security, confidentiality, authenticity, privacy and data access rights.

Methods may include receiving a request from an untrusted node for the data payload. In response to receiving the request from the untrusted node, a trusted node may mask target information included in the data payload before transmitting the data payload to the untrusted node. The trusted node may generate a new digital signature for the masked data payload. The masking may hide a subset of information from being viewed by the untrusted node.

In response to receiving the request from the untrusted node, a trusted node may forward target information included in the data payload to the untrusted node. The target information may be less than all of data included the data payload. The trusted node may create a new data payload that includes the target information destined for the untrusted node.

A second trusted node may generate a new digital signature for the new data payload. The second trusted node may determine target information for transmission to the untrusted node based on an identity of a first trusted node that signed the digital certificate included in the original data payload. The digital certificate generated by the first trusted node may indicate which data elements are transmittable to an untrusted node.

A routing framework for reducing congestion on a network is provided. The routing framework may include an authenticating node. The authenticating node may be a trusted node. The authenticating node may include first computer executable instructions. The first computer executable instructions may be saved in a non-transitory memory on the authenticating node. The first computer executable instructions, when executed by a first processor on the authenticating node, instruct the authenticating node to perform various functions.

Such functions may include detecting receipt of a data payload. The functions may include computing a security clearance for the received data payload. The security clearance may define data elements included in the payload that are allowed or forbidden to be shared with untrusted nodes. The functions may include tokenizing the security clearance for the data payload by adding a digital certificate to the data payload. The authenticating node may generate the digital certificate using a cryptographic key.

The routing framework may include a first receiving node. The first receiving node may include second computer executable instructions. The second computer executable instructions may be stored on non-transitory memory within the first receiving node. The second computer executable instructions may be executed by a second processor on the first receiving node. The second computer executable instructions, when executed by the second processor instruct the first receiving node to perform various functions.

The functions performed by the first receiving node may include receiving the data payload from the authenticating node. The functions may include authenticating the digital signature generated by the authenticating node. The digital certificate may be included in the data payload. The first receiving node may authenticate the digital signature before forwarding the data payload to a second receiving node.

The authenticating node may receive a request for the data payload from the first receiving node. Based on a geographic location of the first receiving node, the authenticating node may mask information included in the data payload before forwarding the data payload to the first receiving node. For example, the first receiving node may not include hardware or software capable of securing confidential information included in the data payload.

The functions of the authenticating node include receiving a request for the data payload from the first receiving node. Based on a security clearance associated with the first receiving node, the authenticating node may mask information included in the data payload before forwarding the data payload to the first receiving node. Masking the information may render certain information included in the data payload inaccessible to the untrusted node.

For example, the masking may include encrypting target information included in the data payload. The encrypting of the target information may be performed using a public cryptographic key. A private cryptographic key may only be accessible to trusted nodes on the network. Other information in the data payload may be encrypted using a private cryptographic key. The untrusted nodes may have access to the public cryptographic key needed to decrypt the other information.

A function of the authenticating node may include receiving a request for the data payload from the first receiving node. Based on a position of the first receiving node within the network, the authenticating node may mask information included in the data payload before forwarding the data payload to the first receiving node. For example, if the first receiving node is connected to the network via unsecure communication equipment (e.g., modem, hub, bridge or switch), the authenticating node may mask information before transmitting the data payload to the first receiving node.

The authenticating node may generate a digital certificate using a first cryptographic key. The digital certificate may be authenticated by the first receiving node using a second cryptographic key. The first and second cryptographic keys may form an asymmetric public-private cryptographic pair. In an asymmetric cryptographic regime, data encrypted using a public cryptographic key may only be decrypted using the private cryptographic key paired to the corresponding public cryptographic key.

Similarly, data encrypted using the private cryptographic key can only be decrypted using the public cryptographic key paired to the corresponding private cryptographic key. Thus, when the authenticating node uses a private cryptographic key to encrypt data, any node, even untrusted nodes, may have access to the public cryptographic key needed to decrypt the data and verify authenticity of the data.

In some embodiments, a receiving node may generate a second digital certificate for a data payload received from the authenticating node. The receiving node may replace the first digital signature (generated by the authenticating node) with the second digital signature before forwarding the data payload to a another receiving node. For example, the first digital certificate may expire after a predetermined time window. After expiration, nodes on the network may not accept the data payload without generating a new digital certificate.

A trusted receiving node may be configured to examine the digital certificate and determine a "time-to-live" or "TTL" associated with the digital certificate. The TTL may be implemented as a counter or timestamp attached to or embedded in the digital certificate. For example, under the Internet Protocol, TTL is an 8-bit field. In the IPv4 header, TTL is the 9th octet of 20. In the IPv6 header, it is the 8th octet of 40. In the Internet Protocol, the maximum TTL value is 255.

The TTL may be set by the authenticating node that first formulates the data payload. The TTL may be examined by every receiving node. If the TTL expires before the associated data payload reaches a receiving node, the data payload may be destroyed. In some embodiments, a receiving node may be configured to determine whether a new digital certificate should be generated before the TTL reaches zero.

If the receiving node determines that a TTL associated with a digital certificate is within a threshold range of expiration, the receiving node may attempt to generate a new digital certificate for the data payload. The new digital certificate may have its own TTL and other nodes that receive the data payload may rely on the new digital certificate for authentication.

A routing framework for reducing congestion on a network is provided. The routing framework may include a first receiving node. The first receiving node may include machine executable instructions that, when executed by a processor, configure the first receiving node to perform various functions. The functions may include receiving a data payload. The functions may include computing a security tier for the data payload.

The computing the security tier may include analyzing information included in the data payload and determining a sensitivity of the information. For example, the computed security tier may determine whether the data payload can be freely shared with untrusted nodes. The computed security tier may determine whether the data payload includes information that must be masked before the data payload is shared with an untrusted node.

The functions may include tokenizing the security tier. The security tier may be tokenized by adding a first digital certificate to the data payload. The digital certificate may identify information in the data payload that is off limits to untrusted nodes. The digital certificate may include encrypting information that may be shared with untrusted nodes using a first cryptographic key and encrypting information that cannot be shared with the untrusted nodes using a second cryptographic key.

A second receiving node configured to receive the data payload from the first receiving node. The second receiving node may authenticate the first digital signature. The second receiving node may replace the first digital signature with a second digital signature before forwarding the data payload to a third receiving node. The second digital signature may encrypt the data payload such that the data payload is inaccessible to the third receiving node. For example, the third receiving node may be an untrusted node. The second digital signature may encrypt the data payload such that the data payload is accessible to the third receiving node. For example, the third receiving node may be a trusted node.

Shifting authentication of data payloads to be processed locally by each node on the network may reduce congestion on a network. Shifting authentication of data payloads to be processed locally by each node on the network may also enhance security on the network by preventing untrusted nodes from accessing certain data payloads or information within those data payloads. Shifting authentication of data payloads to be processed locally by each node on the network may improve data transmission across the network because authentication does not require inter-node communication.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative network 100. Network 100 includes a plurality of nodes. For example, FIG. 1 shows that network 100 includes nodes 103 through 123. Each node may itself be a network. For example, nodes 107, 109, 115, 117 and 119 are network that include other nodes. FIG. 1 shows that data payload 102 may be received at node 103. Data payload 102 is transported by container 101. Node 103 may authenticate data payload 102. Authenticating data payload 102 may include evaluating credentials submitted by a user that created data payload 102. Authenticating data payload 102 may include verifying information included in data payload against records stored in a database or other trusted data source.

Figure 2:
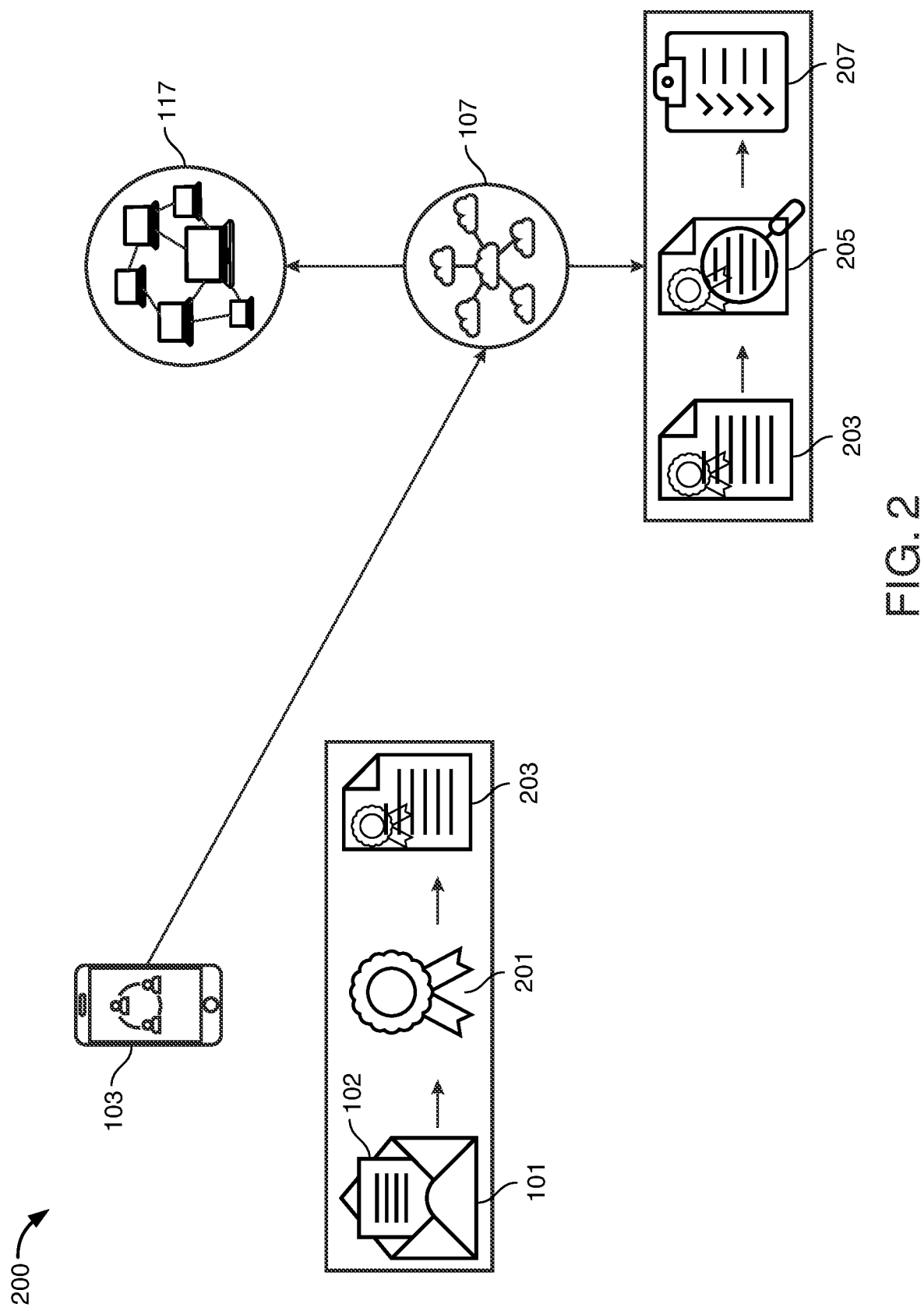
FIG. 2 shows illustrative nodes and an authentication process in accordance with principles of the disclosure.

FIG. 2 shows illustrative process 200. Process 200 may begin after node 103 receives data payload 102. Node 103 may authenticate data payload 102. Authenticating data payload 102 may include obtaining and validating credentials from a user or customer that submits data payload 102 to node 103. For example, node 103 may provide access to an online banking application and data payload 102 may be a remote deposit request submitted by a user.

Authenticating data payload 102 may include submitting data payload 102 to a remote server (not shown) such as a cloud computing environment. The remote server may determine whether data payload 102 corresponds to records stored on the remote server.

After authenticating data payload 102, node 103 generates digital certificate 201. Digital certificate 201 attests that node 103 has authenticated data payload 102. Digital certificate 201 may be generated by creating a hash value and encrypting the hash value using a cryptographic key. The cryptographic key may be a public or private cryptographic key.

Digital signature 201 is then embedded into data payload 102 to create authenticated data payload 203. In some embodiments (not shown), digital signature 201 may be embedded into container 101 to create authenticated data payload 203. Any node that subsequently receives data payload 102 may examine and validate digital certificate 201. Digital certificate 201 may be examined and validated locally on another node. For example, scenario 200 shows that node 107 receives authenticated data payload 203 from node 103. Node 107 may use its own local processing power to validate authenticated data payload 203. By using its own local processing power, node 107 does not need to consume network bandwidth to communication with node 103 or a remote computer server to validate authenticated data payload 203.

Node 107 may receive a request for data payload 102 from node 117. Before transmitting data payload 102 to node 117, node 107 may determine whether node 117 has a security tier eligible to receive the information included in data payload 102. Node 107 may examine the information (shown as 205) included in data payload 102 and determine (shown as 207) whether the information can be transmitted to node 117. Items 207 shows that all information included in data payload 102 may be transmitted to node 117. Node 107 may then transmit authenticated data payload 203 to node 117.

Figure 3:
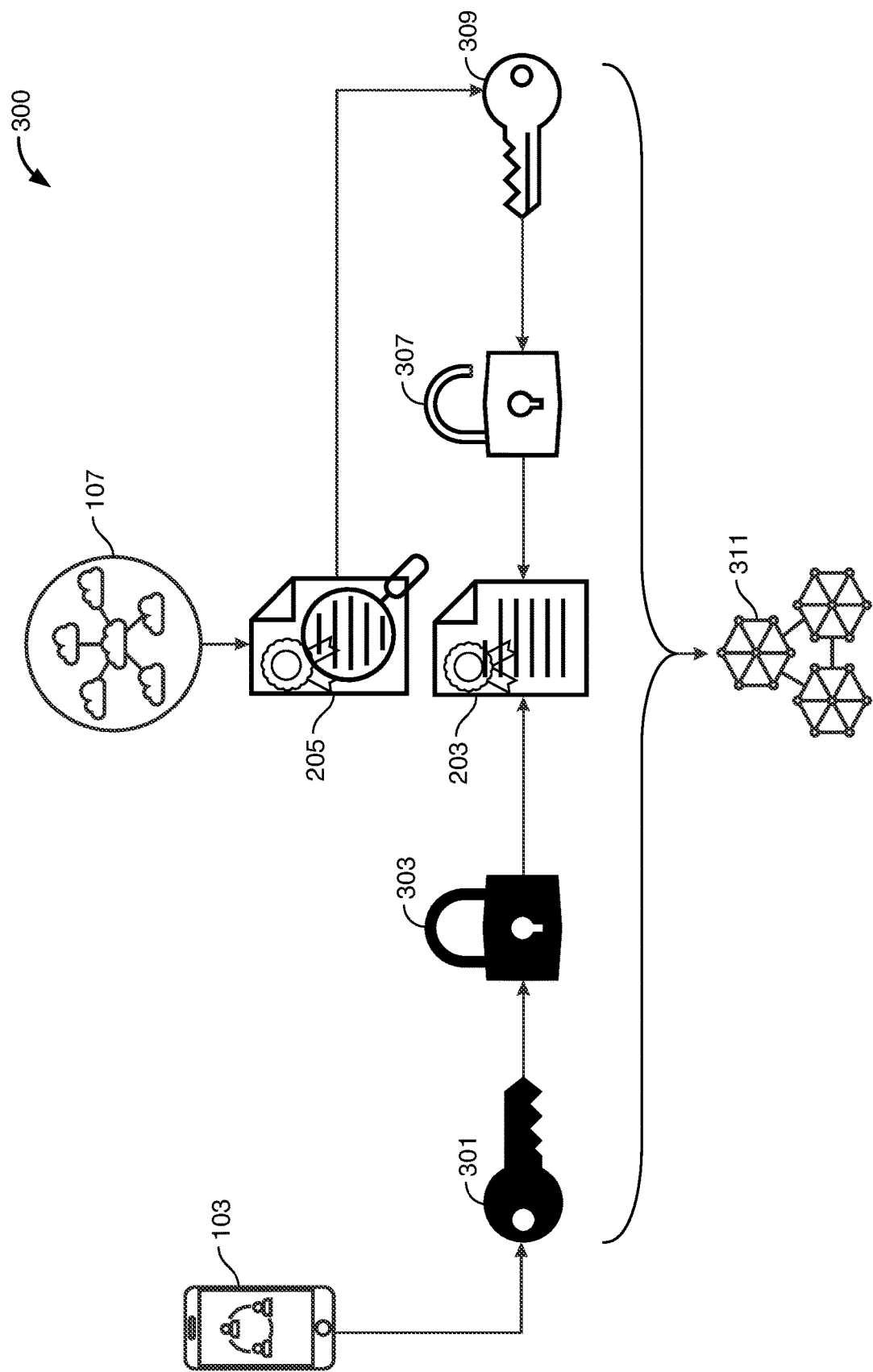
FIG. 3 shows illustrative nodes and an authentication process in accordance with principles of the disclosure.

FIG. 3 shows illustrative scenario 300 for creating digital certificate 201 (shown in FIG. 2) and validating authenticated data payload 203. Scenario 300 shows that node 103 may use cryptographical key 301 to generate encrypted version 303 of a hash value. The hash value may be generated based on information included in data payload 102. The encrypted hash value may be embedded into data payload 102 or container 101 to create authenticated data payload 203.

Authenticated data payload 203 may then be transmitted to other nodes on network 100 (shown in FIG. 1). Scenario 300 shows that when node 107 receives authenticated data payload 203, it performs procedure 205 to validate authenticated data payload 203. Procedure 205 includes using cryptographical key 309 to generate decrypted version 307 of authenticated data payload 203. After decrypting, node 107 may determine whether a hash value of data payload 102 received from node 103 matches a hash value of data payload 102 computed by node 107. If the two hash values match, node 107 may be sure that the information included in data payload 102 has not been changed after creation of authenticated data payload 203 by node 103.

Scenario 300 also shows that the process for creating digital certificate 201 and validating authenticated data payload 203 may utilize distributed ledger 311. Distributed ledger 311 may include a decentralized and tamperproof database. The tamperproof database may store electronic data records. Records stored on a distributed ledger may gathered into "blocks."

A complete copy of the electronic records stored within the database may be stored on multiple nodes. The distributed ledger may be defined by a plurality of nodes. Each record or block of records stored on distributed ledger 311 may be linked or "chained" (hence the term "blockchain" for distributed ledgers that store records in blocks) to another record or block such that a change to information in any single record triggers a change to all records linked to the changed record.

Each record stored within distributed ledger 311 may include data and metadata. Metadata may include a reference to another record in the chain and a unique identifier generated based on metadata in another block. Records may be linked to one another and secured using cryptography. The unique identifier associated with a record may be a hash value. A change of even one letter in contents of a record may result in a different hash value.

Thus, for a malicious node to alter a record stored in distributed ledger 311, the malicious node would need to change all records that have been, and will be, subsequently linked to the changed record. As will be explained below, a consensus mechanism for changing records stored on distributed ledger 311 makes any such effort by a malicious node unfeasible. Therefore, distributed ledger 311 provides tamperproof and auditable storage of records.

Distributed ledger 311 may include protocols that allow records to be audited by any node. However, records may only be added to distributed ledger 311 when nodes responsible for maintaining distributed ledger 311 reach an agreement in accordance with a consensus mechanism in effect on distributed ledger 311.

One exemplary consensus mechanism is proof of work. Each node that wishes to add a new record to distributed ledger 311 must successfully solve a computationally intensive task before being authorized to add the new record. The proof of work is typically complex to solve and at the same time easily verifiable by other nodes after completion. This dichotomy ensures that only one node is authorized to add new records and that all other nodes can easily verify that the new records have been properly linked to prior records.

The computationally intensive nature of the proof of work process provides tamperproof and auditable storage of records. It is computationally expensive for a malicious node to modify records and attempt to corrupt contents of records stored on distributed ledger 311. Other nodes on the network continuously generate new records, outrunning the malicious node in the process of adding new records to distributed ledger 311. Therefore, a reliable branch of blocks or other repository of records will grow faster than any new (and possible fraudulent) records added to the distributed ledger by the malicious node. Nodes participating in distributed ledger 311 are programmed to recognize the largest record repository on the network as the authoritative record source. Nodes will therefore invalidate any smaller repositories created by the malicious node.

For a malicious node to successfully add a manipulated record to distributed ledger 311, it would be necessary for the malicious node to solve the proof of work faster than the rest of nodes on distributed ledger 311. On a distributed ledger system, this is structured to be computationally too expensive for the malicious node. Accomplishing this feat requires the malicious node to have control of at least 51% of the computing resources in use to maintain the distributed ledger system. Distributed ledger 311 may use any suitable consensus mechanism that maintains integrity of records stored on the distributed ledger. Other exemplary consensus mechanisms may include Delegated Proof of Stake, Transaction as Proof of Stake or Delegated Byzantine Fault Tolerance.

A cryptographic key may be stored in a digital wallet. Access to the cryptographic key may be controlled by the digital wallet. A digital wallet is typically configured to interact with nodes on distributed ledger 311. A digital wallet may include hardware and software that authenticated data payload 203 based on a cryptographic key controlled by the digital wallet. For example, the digital wallet may generate authenticated data payload 203 that authorizes payments or purchases using funds stored in a bank account. Authenticated data payload 203 may include information associated with the bank account, such as an identifier of the account and a current balance available in the account.

Figure 4:
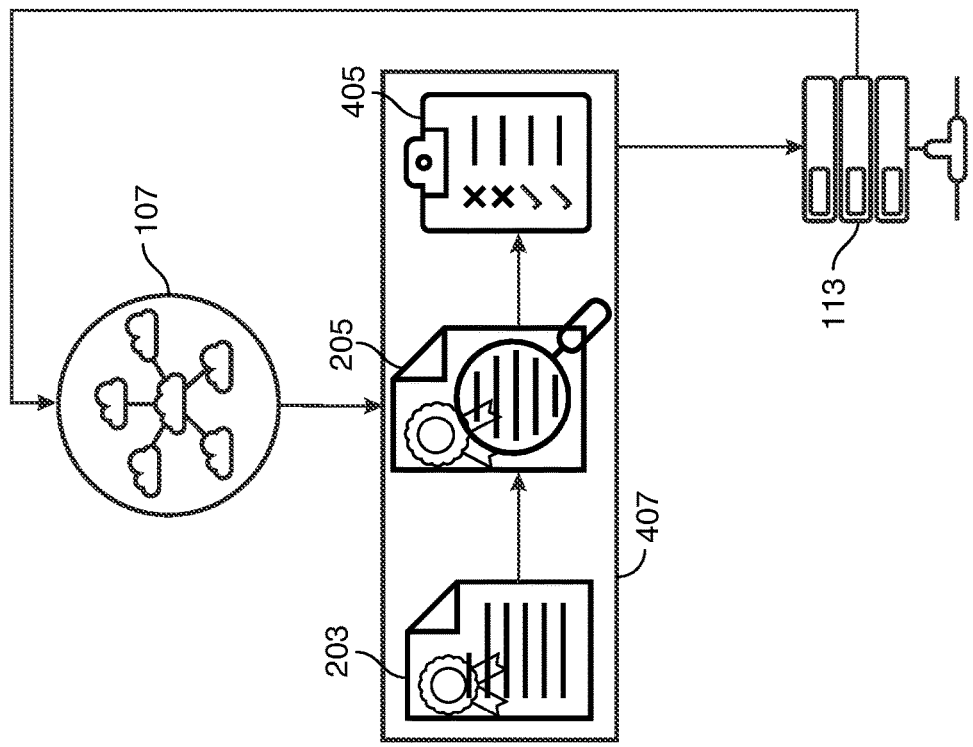
FIG. 4 shows illustrative nodes and an authentication process in accordance with principles of the disclosure.
Figure 4:
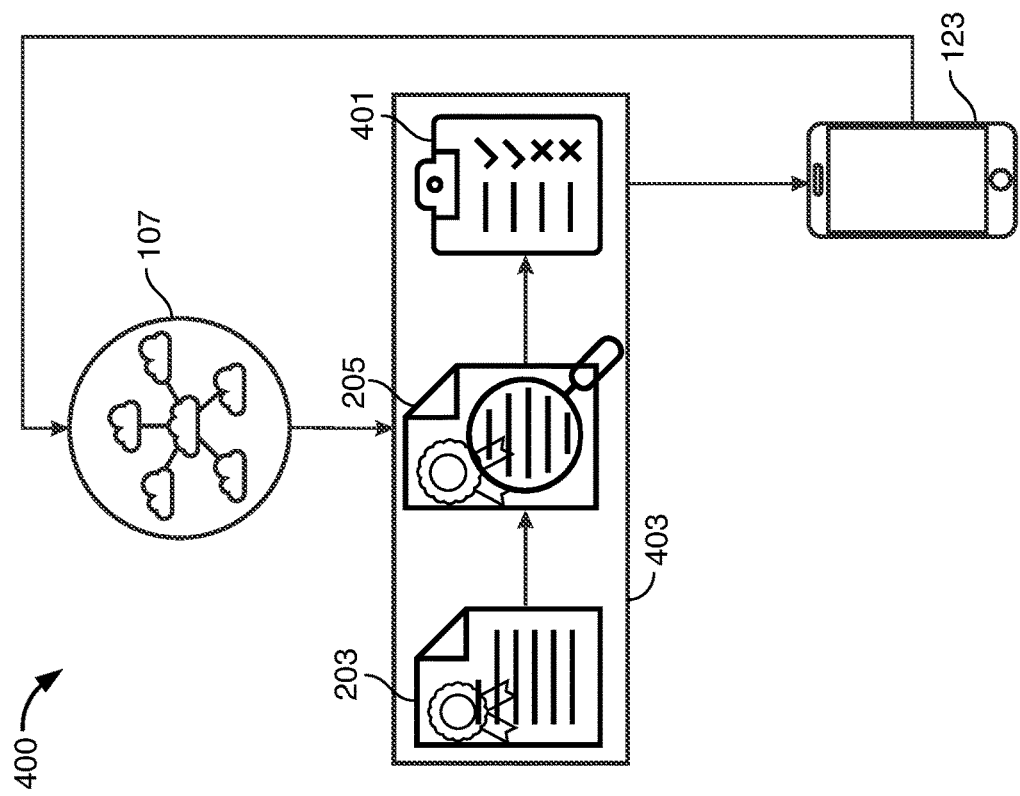

FIG. 4 shows illustrative scenario 400. In scenario 400, node 107 receives a request for authenticated data payload 203 from node 123 and node 113. In response to the request from node 123, node 107 performs procedure 403 to compute a security tier for authenticated data payload 203 for node 123. Procedure 403 includes examination 205 of information included in authenticated data payload 203 and determining whether authenticated data payload 203 can be shared with node 123. For example, computed security tier 401 shows that authenticated data payload 203 includes some information (x's) that must be masked before being shared with node 123. Computed security tier 401 shows that authenticated data payload 203 includes some information (checks) that may be shared with node 123.

In response to the request from node 113, node 107 performs procedure 407 to compute a security tier for authenticated data payload 203 for node 113. Procedure 407 includes examination 205 of information included in authenticated data payload 203. For example, computed security tier 405 shows (x's) that authenticated data payload 203 includes information that must be masked before being shared with node 113. Computed security tier 405 shows that authenticated data payload 203 includes some information (checks) that may be shared with node 113.

Scenario 400 shows that computed security tier 401 for node 123 is different than computed security tier 405 for node 113. Thus, scenario 400 shows that the information in authenticated payload 203 that may be shared with node 123 is different from the information in authenticated payload 203 that may be shared with node 113. Node 107 may excise or mask different informational items depending on whether authenticated data payload 203 is being transmitted to node 123 or node 113. Node 107 may generate a new digital certificate for a data payload transmitted to node 123 or node 113.

Figure 5:
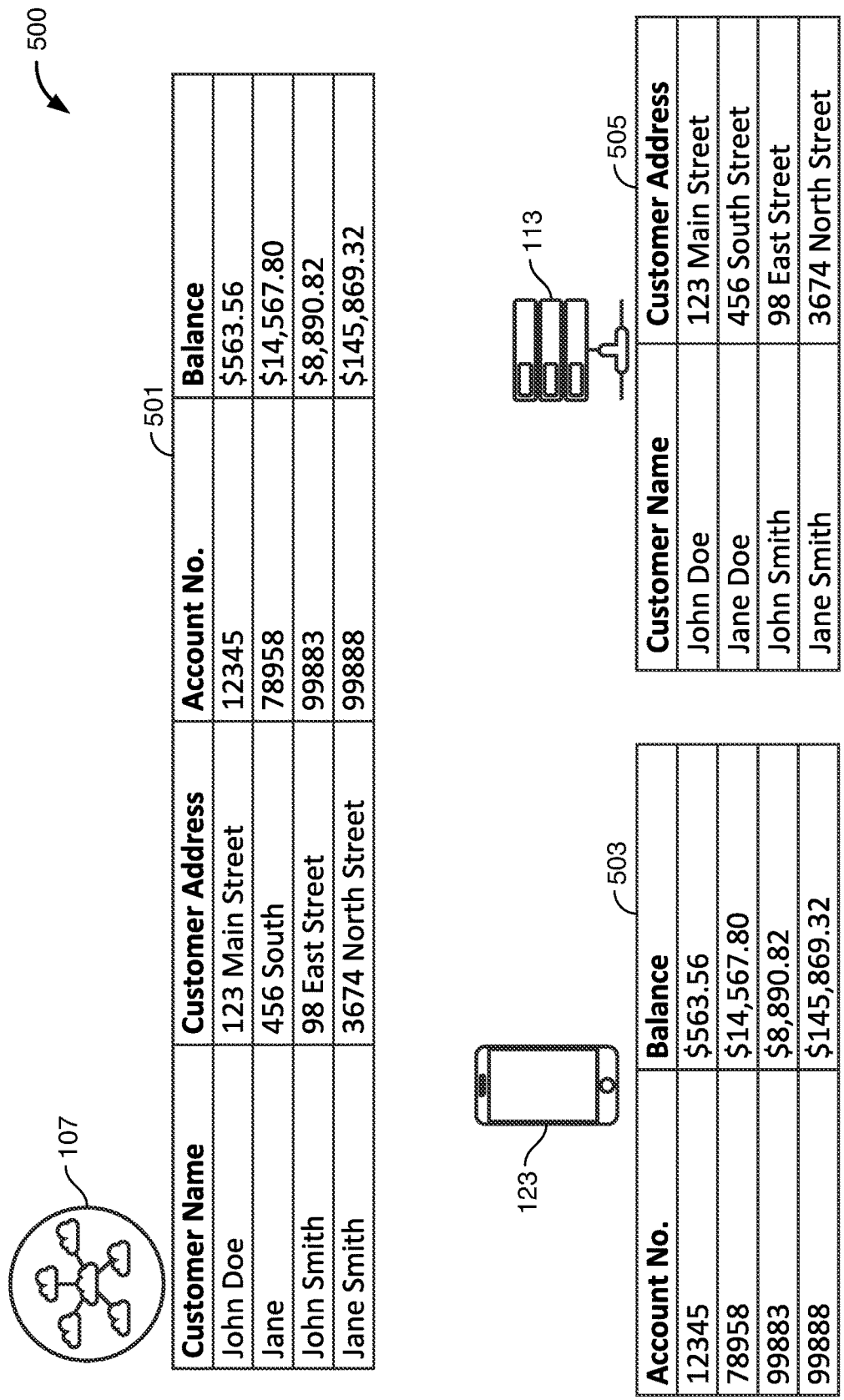
FIG. 5 shows an illustrative nodes and data received by the nodes in accordance with principles of the disclosure.

FIG. 5 shows illustrative information 500 that may be included in data payload 102 or authenticated data payload 203. FIG. 5 shows that node 107 may receive authenticated data payload 203 that includes information 501. As shown in FIG. 3, node 107 may receive authenticated data payload 203 from node 103.

As shown in FIG. 4, node 107 may receive requests for authenticated data payload 203 from nodes 123 and 113. In response to those requests, node 107 may compute security tiers 403 and 407. Based on security tier 403, node 107 may generate a new authenticated data payload for node 123 that includes information 503. Information 503 omits "Customer name" and "Customer address" information included in information 501. In some embodiments, node 107 may mask or redact "customer name" and "customer address" information and then generate a new digital certificate for the data payload that include masked or redacted information. Node 123 may not meet a security tier that is eligible to receive all of information 501.

Based on security tier 407, node 107 may generate a new authenticated data payload for node 113 that includes information 505. Information 505 omits "Account No." and "Balance" information included in information 501. In some embodiments, node 107 may mask or redact "Account No." and "Balance" information and then generate a new digital certificate for the data payload that includes masked or redacted information. Node 123 may not meet a security tier that is eligible to receive all of information 501.

FIG. 6 shows illustrative data flow 600 between nodes of network 101. Data flow 600 shows how methods and apparatus described herein may reduce congestion on network 101. Data flow 600 shows, in broken-line arrows, communication pathways that are required in a conventional network to authenticate data payload 102. For example, the broken-line arrows show that when nodes 107, 121, 119 or 123 receive data payload 102, each of the nodes must communicate with node 103, the node that first captured data payload 102, to confirm authenticity of data payload 102.

Data flow 600 shows, in solid-line arrows, communication pathways that are required using apparatus and methods described herein. Using apparatus and methods described herein, when nodes 107, 121, 119 or 123 receive data payload 102, each of the nodes can locally validate authenticated data payload 203, which avoids communication with originating node 103. Thus, using apparatus and methods described herein, the communication pathways shown in broken-line arrows are eliminated, freeing up network bandwidth and reducing congestion on network 101.

Thus, methods and apparatus for a DECENTRALIZED EDGE NODE AUTHENTICATION are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A routing framework for reducing congestion on a network, the routing framework comprising:
    an authenticating node comprising first computer executable instructions stored in a non-transitory memory, that when executed by a first processor on the authenticating node:
        detect receipt of a data payload;
        compute a security clearance for the data payload; and
        tokenize the security clearance by adding a digital certificate to the data payload;
    a first receiving node comprising second computer executable instructions, that when executed by a second processor on the first receiving node:

receive the data payload from the authenticating node; and authenticate the digital certificate before forwarding the data payload to a second receiving node;

wherein the digital certificate is a first digital certificate, and the second receiving node is configured to:

receive the data payload from the first receiving node;

generate a second digital certificate for the data payload; and replace the first digital certificate with the second digital certificate before forwarding the data payload to a third receiving node.

2. The routing framework of claim 1 the authenticating node further configured to:

receive a request for the data payload from the first receiving node; and based on a geographic location of the first receiving node, mask information included in the data payload before forwarding the data payload to the first receiving node.

3. The routing framework of claim 1 the authenticating node further configured to:

receive a request for the data payload from the first receiving node; and based on a security clearance associated with the first receiving node, mask information included in the data payload before forwarding the data payload to the first receiving node.

4. The routing framework of claim 1 the authenticating node further configured to:

receive a request for the data payload from the first receiving node; and based on a position of the first receiving node within the network, mask information included in the data payload before forwarding the data payload to the first receiving node.

5. The routing framework of claim 1 wherein the digital certificate is generated by the authenticating node using a first cryptographic key and the digital certificate is authenticated by the first receiving node using a second cryptographic key.

6. The routing framework of claim 5 wherein the digital certificate is authenticated by second receiving node using the second cryptographic key.

7. A method for enhancing security of data transmitted on a network, the method comprising:

authenticating a data payload received at a first node on the network;

generating a digital certificate signed by the first node;

in response to successfully authenticating, packaging the data payload and the digital certificate into a container;

forwarding the container to a second node on the network;

at the second node, confirming that the digital certificate has been signed by the first node; and in response to the confirming, forwarding the container to a third node on the network;

wherein the confirming further comprises:

encrypting first information included in the data payload using a first public cryptographic key; and encrypting second information included in the data payload using a second private cryptographic key; and wherein, a first private cryptographic key for decrypting the first information is only available to trusted nodes on the network and a second public cryptographic key for decrypting the second information is available to untrusted nodes on the network.

8. The method of claim 7 further comprising:

determining that the digital certificate has not been signed by the first node; and in response to the determining, authenticating the data payload using the second node.

9. The method of claim 7 further comprising, after a threshold number of nodes confirming that the digital certificate has been signed by the first node, forwarding the data payload within the network without checking that the digital certificate has been signed by the first node.

10. The method of claim 7, the confirming comprising determining whether the digital certificate is associated with a timestamp outside target time window.

11. The method of claim 7, the confirming comprising determining whether the digital certificate has been signed by a node within a target geographic location.

12. The method of claim 11 further comprising:

at a fourth node, receiving the data payload from an untrusted node;

confirming that the digital certificate has been signed by the first node; and in response to the confirming, utilizing the data payload in a trusted application.

13. The method of claim 7, further comprising:

receiving a request from an untrusted node for the data payload; and in response to the request, masking target information included in the data payload before transmitting the data payload to the untrusted node.

14. The method of claim 7, further comprising:

receiving a request from an untrusted node for the data payload; and in response to the request:

removing information from the data payload; and creating a new data payload; and forwarding the new data payload to the untrusted node.

15. The method of claim 14 further comprising, removing the information based on an identity of the first node that signed the digital certificate.

* * * * *